United States Patent [19]

Langley et al.

[11] 4,238,599

[45] Dec. 9, 1980

[54] POLYESTER OF PARA-HYDROXY BENZOIC ACID, 1,2-BIS(PARA-CARBOXY PHENOXY)ETHANE, TEREPHTHALIC ACID AND SUBSTITUTED HYDROQUINONE CAPABLE OF FORMING AN ANISOTROPIC MELT WHICH READILY UNDERGOES MELT PROCESSING

[75] Inventors: Jeffrey T. Langley, Pineville; Robert M. Mininni, Charlotte, both of N.C.

[73] Assignee: Fiber Industries, Inc., Charlotte, N.C.

[21] Appl. No.: 10,392

[22] Filed: Feb. 8, 1979

[51] Int. Cl.$^3$ .................. C08G 63/60; C08G 63/66
[52] U.S. Cl. ....................... 528/193; 528/194
[58] Field of Search ................ 528/191, 193, 194

[56] References Cited

U.S. PATENT DOCUMENTS

| | | | |
|---|---|---|---|
| 3,991,013 | 11/1976 | Pletcher | 528/193 |
| 3,991,014 | 11/1976 | Kleinschuster | 528/193 |
| 4,067,852 | 1/1978 | Calundann | 528/193 |
| 4,083,829 | 4/1978 | Calundann et al. | 528/193 |
| 4,118,372 | 10/1978 | Schaefgen | 528/193 |
| 4,130,545 | 12/1978 | Calundann | 528/193 |
| 4,140,846 | 2/1979 | Jackson, Jr. et al. | 528/193 |

*Primary Examiner*—Lester L. Lee
*Attorney, Agent, or Firm*—Andrew F. Sayko, Jr.

[57] ABSTRACT

A novel polyester is provided which has been found to exhibit an anisotropic melt phase at a temperature which enables it readily to undergo melt processing to form quality fibers, molded articles, etc. The polyester of the present invention is different in character than polyesters of the prior art and includes as essential ingredients moieties derived from para-hydroxy benzoic acid, 1,2-bis(para-carboxy phenoxy)ethane, terephthalic acid, and substituted hydroquinone in the proportions indicated. The polyester of the present invention generally can be more economically produced than polyesters of the latter three moieties (two of which are relatively expensive) while surprisingly yielding an anisotropic melt of relatively low viscosity at a desirable temperature for melt processing in spite of the substantial concentration of relatively stiff para-oxybenzoyl moieties which contribute to the overall nature of the resulting polyester. In a preferred embodiment the polyester is capable of undergoing melt processing at a temperature below approximately 300° C., and in a particularly preferred embodiment at a temperature below approximately 290° C. (e.g., with standard equipment commonly used to melt process polyethylene terephthalate).

22 Claims, No Drawings

POLYESTER OF PARA-HYDROXY BENZOIC ACID, 1,2-BIS(PARA-CARBOXY PHENOXY)ETHANE, TEREPHTHALIC ACID AND SUBSTITUTED HYDROQUINONE CAPABLE OF FORMING AN ANISOTROPIC MELT WHICH READILY UNDERGOES MELT PROCESSING

BACKGROUND OF THE INVENTION

Aromatic polyester resins have long been known. For instance, p-hydroxy benzoic acid homopolymer and copolymers have been provided in the past and are commercially available. Those aromatic polyesters normally encountered in the prior art have tended to be somewhat intractable in nature and to present substantial difficulties if one attempts to melt process the same while employing conventional melt processing procedures. Such polymers commonly are crystalline in nature, relatively high melting or possess a decomposition temperature which is below the melting point, and when molten frequently exhibit an isotropic melt phase. Molding techniques such as compression molding or sintering may be utilized with such materials; however, injection molding, melt spinning, etc. commonly have not been viable alternatives or when attempted commonly have been accomplished with difficulty. Such polymers commonly cannot be melt extruded to form nondegraded fibers. Even those aromatic polymers which exhibit a melting point below their decomposition temperature commonly melt at such high temperatures that quality fibers may not be melt spun. For instance, fibers melt extruded at extremely high temperatures commonly possess a voidy internal structure and diminished tensile properties.

Representative publications which discuss aromatic polyesters include: (a) *Polyesters of Hydroxybenzoic Acids*, by Russell Gilkey and John R. Caldwell, J. of Applied Polymer Sci., Vol. II, Pages 198 to 202 (1959), (b) Polyarylates (*Polyesters from Aromatic Dicarboxylic Acids and Bisphenols*), by G. Bier, Polymer, Vol. 15, Pages 527 to 535 (August 1974), (c) *Aromatic Polyester Plastics*, by S. G. Cottis, Modern Plastics, Pages 62 to 63 (July 1975), and (d) *Poly (p-Oxybenzol Systems): Homopolymer for coatings: Copolymers for Compression and Injection Molding*, by Roger S. Storm and Steve G. Cottis, Coatings Plast. Preprint, Vol. 34, No. 1, pages 194 to 197 (April 1974). See also, U.S. Pat. Nos. 3,039,994; 3,169,121; 3,321,437; 3,553,167; 3,637,595; 3,651,014; 3,723,388; 3,759,870; 3,767,621, 3,778,410; 3,787,370; 3,790,528; 3,829,406; 3,890,256; and 3,975,487.

Also, it more recently has been disclosed that certain polyesters may be formed which exhibit melt anisotropy. See for instance, (a) *Polyester X7G-A Self Reinforced Thermoplastic*, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1 to 4, (b) Belgian Pat. Nos. 828,935 and 828,936, (c) Dutch Pat. No. 750551, (d) West German Pat. Nos. 2520819 and 2520820, (e) Japanese Pat. Nos. 43-233, 3017—692, and 3021–293, and (f) U.S. Pat. Nos. 3,991,013; 3,991,014; 4,067,852; 4,075,262; 4,083,829; 4,118,372; and 4,130,545. See also commonly assigned U.S. Ser. Nos. 843,933, filed Oct. 20, 1977, and 877,917 filed Feb. 15, 1978.

U.S. Pat. No. 3,991,013 discloses inter alia a specific polyester derived from 1,2-bis(para-carboxyphenoxy) ethane, terephthalic acid and substituted hydroquinone. Such polymer requires greater concentrations of the two relatively expensive moieties which are derived from 1,2-bis(para-carboxyphenoxy) ethane and the substituted hydroquinone. Also, the melting point of the presently claimed polymer tends to be desirably depressed below that exhibited by that disclosed in U.S. Pat. No. 3,991,013 at the same concentration of polymer units derived from 1,2-bis(para-carboxyphenoxy)ethane.

It is an object of the present invention to provide an improved melt processable polyester which exhibits an anisotropic melt phase.

It is an object of the present invention to provide an improved melt processable polyester which includes moieties derived from 1,2-bis(para-carboxyphenoxy)ethane, terephthalic acid and substituted hydroquinone wherein the required concentrations of such moieties derived from 1,2-bis(para-carboxyphenoxy)ethane and substituted hydroquinone are reduced and supplemented by a moiety derived from para-hydroxy benzoic acid to yield a novel more economical polyester exhibiting highly attractive properties.

It is an object of the present invention to provide an improved polyester which is suited for the formation with ease of quality melt extruded fibers, molded articles, and melt extruded films.

It is an object of the present invention to provide an improved melt processable polyester capable of forming an anisotropic melt phase at a temperature no higher than approximately 320° C., preferably below approximately 300° C., and most preferably below approximately 290° C.

It is an object of the present invention to provide a novel polyester which is capable of melt processing in standard equipment commonly utilized with polyethylene terephthalate.

It is an object of the present invention to provide an improved polyester which forms a low viscosity highly tractable melt phase.

It is an object of the present invention to provide an improved polyester which forms an anisotropic melt phase at a temperature well below its decomposition temperature, and which may form quality high performance fibers.

It is an object of the present invention to provide improved polyester fibers which particularly are suited for use as fibrous reinforcement in a rubber matrix.

It is another object of the present invention to provide an improved polyester which readily may be melt extruded to form a film.

It is another object of the present invention to provide an improved polyester which readily may be injection molded to form a molded article (which optionally may be fiber reinforced) exhibiting superior tensile strength, flex strength, and impact strength.

These and other objects, as well as the scope, nature and utilization of the invention will be apparent to those skilled in the art from the following detailed description.

SUMMARY OF THE INVENTION

It has been found that a novel melt processable polyester capable of forming an anisotropic melt phase at a temperature no higher than approximately 320° C. consists essentially of the recurring moieties I, II, III and IV wherein:

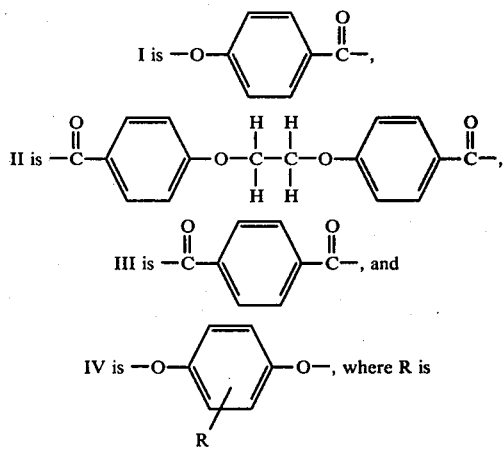

methyl, chloro, bromo, or mixtures thereof, and is substituted for a hydrogen atom present upon the aromatic ring, and wherein the polyester comprises approximately 20 to 60 mole percent of moiety I, approximately 5 to 18 mole percent of moiety II, approximately 5 to 35 mole percent of moiety III, and approximately 20 to 40 mole percent of moiety IV.

DESCRIPTION OF PREFERRED EMBODIMENTS

The polyester of the present invention consists essentially of at least four recurring moieties which when combined in the polyester have been found to form an atypical anisotropic melt phase at a temperature no higher than approximately 320° C., preferably below approximately 300° C., and most preferably below approximately 290° C. (e.g. at approximately 260° to 300° C.). The polymer melting temperatures may be confirmed by the use of a differential scanning calorimeter (i.e. DSC) employing repeat scans at a 20° C. per minute heat-up rate and observing the peak of the DSC melt transition. The polyester commonly exhibits a melting point of at least 240° C. and preferably of at least 260° C. as determined by differential scanning calorimetry. Because of its ability to exhibit anisotropic properties (i.e., liquid crystals) in the melt, the polyester readily can form a product having a highly oriented molecular structure upon melt processing. Preferred polyesters are capable of undergoing melt processing at a temperature in the range of approximately 280° to 300° C. employing equipment commonly utilized with polyethylene terephthalate. The usual difficulties incurred when one attempts to melt process aromatic polyesters by conventional melt processing techniques effectively are eliminated.

Moiety I can be termed a para-oxybenzoyl moiety and possesses the structural formula:

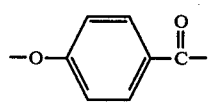

This moiety is relatively inexpensive and is derived from para-hydroxy benzoic acid or its derivatives. Moiety I is present in a substantial concentration which comprises approximately 20 to 60 mole percent of the polyester (e.g. 30 to 50 mole percent of the polyester).

In a preferred embodiment moiety I is present in a concentration of 35 to 45 mole percent of the polyester (e.g. 40 mole percent of the polyester). This moiety forms a relatively stiff unit in the resulting polyester chain which nevertheless surprisingly has been found to enable the overall polyester to exhibit (1) a melting point which is not unduly elevated and is advantageous for melt processing, and (2) desirable anisotropic properties in a relatively low viscosity melt phase.

The second essential moiety (i.e. moiety II) can be termed a 1,2-ethylenedioxy-4,4'-dibenzoyl moiety and possesses the structural formula:

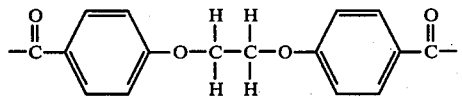

This moiety is presently relatively expensive to provide and can be derived from the commercially available compound 1,2-bis(para-carboxyphenoxy)ethane which is sometimes termed ethylenedioxy-4,4'-dibenzoic acid. Moiety II is present in a minor concentration of approximately 5 to 18 mole percent of the polyester, and preferably in a concentration of 10 to 15 mole percent of the polyester. It has been found that the polyester of the present invention forms the desired anisotropic melt at an optimum temperature from a fiber/resin properties viewpoint when one incorporates moiety II in the more preferred concentrations.

The third essential moiety (i.e. moiety III) can be termed a terephthaloyl moiety and possesses the structural formula:

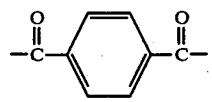

This moiety is relatively inexpensive and is derived from terephthalic acid. Moiety III is present in a concentration of approximately 5 to 35 mole percent of the polyester, and preferably in a concentration of 15 to 25 mole percent of the polyester (e.g. approximately 20 mole percent).

The fourth essential moiety (i.e. moiety IV) is a substituted 1,4-dioxyphenylene moiety of the structural formula:

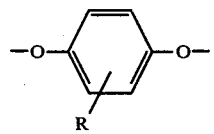

where R is a methyl, chloro, or bromo radical, or mixtures thereof, which is substituted for a hydrogen atom present upon the illustrated aromatic ring. Moiety IV can be provided by methylhydroquinone, chlorohydroquinone, bromohydroquinone, or derivatives thereof. In a preferred embodiment R is methyl and moiety IV is derived from methyl hydroquinone or derivatives thereof. Moiety IV is presently relatively expensive to provide, and is present in a concentration of approximately 20 to 40 mole percent of the polyester, and preferably in a concentration of about 25 to 35 mole percent of the polyester (e.g. approximately 30 mole percent). The total molar concentration of moieties II and III in the resulting polyester is substantially identical to that of moiety IV in preferred embodiments. A slight excess of the substituted hydroquinone may be added to the reaction vessel in order to compensate for a small proportion of this reactant which may be inadvertently volatilized as the polymerization reaction progresses.

Other aryl ester-forming moieties (e.g. dicarboxy units, dioxy units and/or other combined oxy and carboxy units) other than moieties I, II, III and IV additionally may be included in the wholly aromatic polyester of the present invention in a minor concentration (e.g. up to about 10 mole percent) so long as such moieties do not adversely influence the desired anisotropic melt phase exhibited by the polyester heretofore defined, do not raise the melting point of the resulting polymer above that specified or otherwise change the basic character of the polymer. As will be apparent to those skilled in the art, the total molar quantities of all dicarboxy units and dioxy units present within the polyester will be substantially equal. Additionally, a minor quantity of another moiety derived from an aromatic hydroxy acid, such as meta-oxybenzoyl moiety which is derived from m-hydroxy benzoic acid, optionally may be included in the polyester together with moieties I, II, III and IV. This component has the propensity to disrupt the linearity of the polymer thus increasing the amorphous content. Also a 6-oxy-2-naphthoyl moiety optionally may be provided in a minor concentration. In a preferred embodiment the polyester consists solely of the four essential moieties previously identified.

The aromatic polyester of the present invention commonly exhibits

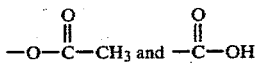

end groups. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

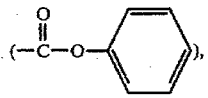

and methylester

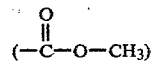

optionally may be included at the end of the polymer chains. The polymer also may be oxidatively crosslinked to at least some degree, if desired, by heating in an oxygen-containing atmosphere (e.g., in air) while in bulk form or as a previously shaped article at a temperature below its melting point for a limited period of time (e.g., for a few minutes).

The aromatic polyesters of the present invention tend to be substantially insoluble in common polyester solvents and accordingly are not susceptible to solution processing. They can surprisingly be readily processed by common melt processing techniques as discussed hereinafter. Most compositions are soluble to a small degree in pentafluorophenol, hexafluoroisopropanol, and 50/50 mixtures of hexafluoroisopropanol and orthochlorophenol.

The polyester prior to heat treatment commonly exhibits an inherent viscosity (i.e., I.V.) of at least approximately 1.0, and preferably at least approximately 2.0, (e.g., approximately 2.0 to 4.0) when dissolved in a concentration of 0.3 weight/volume percent in pentafluorophenol at 60° C. using standard solution viscometry techniques. The inherent viscosity is obtained by dividing the natural logarithm of the relative viscosity by the concentration of the solution. The relative viscosity is the ratio of the flow times for a dilute polymer solution and the pure solvent in a capillary viscometer.

Unlike the aromatic polyesters commonly encountered in the prior art, the polyester of the present invention is not intractable and forms a relatively low viscosity anisotropic melt phase whereby an atypical degree of order is manifest in the molten polymer. The subject polyester readily forms liquid crystals in the melt phase and accordingly exhibits a high tendency for the polymer chains to orient in the shear direction. Such anisotropic properties are manifest at a temperature which readily is amenable for melt processing to form shaped articles, and may be confirmed by conventional polarized light techniques whereby cross-polarizers are utilized. More specifically, the anisotropic melt phase may conveniently be confirmed by the use of a Leitz polarizing microscope at a magnification of 40X with the sample on a Kofler hot stage and under a nitrogen atmosphere. The polymer melt is optically anisotropic, i.e., it transmits light when examined between crossed polarizers. By contrast the melt of a conventional polymer (e.g., polyethylene terephthalate) will not transmit appreciable light when placed between crossed polarizers.

The aromatic polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a melt solution of the reactants with the reaction continuing as solid polymer particles are suspended therein. A vacuum may be applied to facilitate removal of volatiles formed during the final stage of the condensation (e.g., acetic acid or water).

In commonly assigned U.S. Pat. No. 4,083,829 entitled "Melt Processable Thermotropic Wholly Aromatic Polyester" is described a slurry polymerization process which may be employed to form the aromatic polyester of the present invention wherein the solid product is suspended in a heat exchange medium. The disclosure of this patent is herein incorporated by reference.

When employing either the melt acidolysis procedure or the slurry procedure of U.S. Pat. No. 4,083,829 the organic monomer reactants from which the para-oxybenzoyl moiety (i.e. moiety I) and substituted 1,4-dioxyphenylene moiety (i.e. moiety IV) are derived may be initially provided in a modified form whereby the usual hydroxyl groups of these monomers are esterified (i.e., they are provided as acyl esters). For instance, lower acyl esters of parahydroxy benzoic acid and substituted hydroquinone wherein the hydroxy groups are esterified may be provided as reactants. The lower acyl groups preferably have from about 2 to about 4 carbon atoms. Preferably the acetate esters of the organic compounds which form moieties I and IV are provided. Accordingly, particularly preferred reactants for the condensation reaction are 4-acetoxybenzoic acid, methyl hydroquinone diacetate, chloro hydroquinone diacetate, and bromo hydroquinone diacetate. If minor quantities of other aryl reactants (as previously discussed) optionally provide oxy-units within the resulting polymer, these too preferably are provided as the corresponding lower acyl esters.

Representative catalysts which optionally may be employed in either the melt acidolysis procedure or in the slurry procedure of U.S. Pat. No. 4,083,829 include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts such as Lewic acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The inherent viscosity of a previously formed polyester may be further increased via a solid state polymerization procedure wherein the particulate polymer is heated in an inert atmosphere (e.g. in a nitrogen atmosphere at a temperature of about 260° C. for 1 to 12 hours).

The aromatic polyester of the present invention readily can be melt processed to form a variety of shaped articles, e.g. fibers, films, tapes, molded three-dimensional articles, etc. Fibers or films may be melt extruded with ease. The polyester of the present invention also is suited for molding applications and may be molded via standard injection molding techniques commonly utilized when forming molded articles. Unlike the aromatic polyesters commonly encountered in the prior art, it is not essential that more severe injection molding conditions (e.g., higher temperatures), compression molding, impact molding, or plasma spraying techniques be utilized.

A molding compound may be formed from the polyester of the present invention which incorporates approximately 1 to 60 percent by weight of a solid filler (e.g. talc) and/or reinforcing agent (e.g. glass fibers).

The aromatic polyester also may be employed as a coating material which is applied as a powder or from a liquid dispersion.

When forming fibers and films the extrusion orifice may be selected from among those commonly utilized during the melt extrusion of such shaped articles. For instance, the shaped extrusion orifice may be in the form of a rectangular slit (i.e. a slit die) when forming a polymeric film. When forming a filamentary material the spinneret selected may contain one and preferably a plurality of extrusion orifices. For instance, a standard conical spinneret containing 1 to 2000 holes (e.g., 6 to 1500 holes) such as commonly used in the melt spinning of polyethylene terephthalate, having a diameter of about 1 to 60 mils (e.g., 5 to 40 mils) may be utilized. Yarns of about 20 to 200 continuous filaments are commonly formed. The melt-spinnable aromatic polyester is supplied to the extrusion orifice at a temperature above its melting point, e.g., a temperature of about 280° to 310° C. in a preferred embodiment.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have a denier per filament of about 1 to 50, and preferably a denier per filament of about 1 to 20.

The resulting filamentary material or film following extrusion optionally may be subjected to a thermal treatment whereby its physical properties are further enhanced. The tenacity of the fiber or film generally is increased by such thermal treatment. More specifically, the fibers or films may be thermally treated in an inert atmosphere (e.g., nitrogen, argon, helium) with or without stress at a temperature below the polymer melting point until the desired property enhancement is achieved. When stress is applied the tensile modulus may be enhanced. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber may be heated at 250° C. for one hour, at 260° C. for one hour, and at 270° C. for one hour. Particularly good results have been achieved by heating the fiber at approximately 250° C. under nitrogen for 16 to 24 hours. Alternatively, the fiber may be heated at about 15° to 20° C. below the temperature at which it melts for about 48 hours. Optimum heat treatment conditions will vary with the specific composition of the aromatic polyester and with the fiber's process history. In order to minimize any tendency for coalescence between adjoining filaments during the heat treatment, a finely divided particulate solid (e.g. talc, silica, or mixtures of talc and silica) can be applied to a fiber bundle prior to such treatment.

The as-spun fibers formed from the aromatic polyester of the present invention are highly oriented and exhibit physical properties which render them suitable for use in high performance applications. The as-spun fibers commonly exhibit an average single filament tenacity of at least 5 grams per denier (e.g., about 5 to 10 grams per denier), an average single filament tensile modulus of at least about 250 grams per denier (e.g., about 250 to 500 grams per denier), and exhibit an extraordinary dimensional stability at elevated temperatures (e.g., at temperatures of about 150° to 200° C.). Following thermal treatment (previously described) the fibers often exhibit an average single filament tenacity of at least 10 grams per denier (e.g. 10 to 30 grams per denier), and an average single filament tensile modulus well above 250 grams per denier measured at ambient conditions (e.g., 72° F. and 65 percent relative humidity). Such properties enable the fibers to be used with particular advantage as tire cords and in other industrial applications, such as conveyor belts, hose, cabling, resin reinforcement, etc. Films formed of the polyester of the present invention may be used as strapping tape, cable wrap, magnetic tape, electric motor dielectric film, etc. The fibers and films exhibit an inherent resistance to burning.

The following examples are presented as specific illustrations of the claimed invention. It should be understood, however, that the invention is not limited to the specific details set forth in the examples.

EXAMPLE I

To a three-necked, round 300 ml. flask equipped with a mechanical stirrer, argon inlet tube, and distillation head connected to a condenser were added the following:

(a) 43.2 grams para-acetoxybenzoic acid (0.24 mole),
(b) 27.2 grams 1,2-bis(para-carboxyphenoxy)ethane (0.09 mole),
(c) 14.9 grams terephthalic acid (0.09 mole), and
(d) 37.5 grams methyl hydroquinone diacetate (0.18 mole).

The charged flask was vacuum purged with argon and brought to a temperature of 260° C. while placed in a silicone oil bath. The bath temperature next was raised to 280° C. over a period of 20 minutes during which time the distillation of acetic acid began. The bath temperature next was raised to 290° C. over a period of one hour and it was determined that 83 percent of the theoretical amount of acetic acid had been collected by distillation. The temperature was then increased over a 15 minute period to 320° C., and it was determined that 88 percent of the theoretical amount of acetic acid had been collected by distillation. The application of vacuum next was begun, and the pressure in the flask was reduced to 25 mm. Hg. over 10 minutes and further reduced to 0.05 mm. Hg. over 30 minutes. This pressure next was held for 90 minutes at 320° C. The polymer product obtained was a fibrous solid.

This aromatic polyester product had an inherent viscosity (I.V.) of 2.47 as determined in a pentafluorophenol solution of 0.3 weight/volume percent concentration at 60° C. in accordance with the formula:

$$I.V. = \frac{\ln(\eta rel)}{c}$$

where c=concentration of solution (0.3 weight/volume percent), and rel=relative viscosity. The relative viscosity was measured by dividing the flow time in a capillary viscometer of the polymer solution by the flow time for the pure solvent.

When the product was subjected to differential scanning calorimetry analysis (DSC), it exhibited a melting point of 270° C. The polymer melt was anisotropic.

The polymer was melt extruded into a continuous filament of about 10 denier per filament. More specifically, the polymer melt while at a temperature of about 300° C. was extruded through a spinneret provided with a single hole jet having a diameter of 20 mils and a length of 27 mils. The extruded filament was quenched in ambient air. The as-spun filament was taken up at a rate of 396 meters per minute.

The resulting as-spun aromatic polyester fiber exhibited the following average single filament properties:

| | |
|---|---|
| Tenacity (grams per denier) | 6.6 |
| Tensile modulus (grams per denier) | 358 |
| Elongation (percent) | 2.4 |

Following thermal treatment in nitrogen for 88 hours at 250° C. in the absence of longitudinal stress the fiber exhibited the following average single filament properties:

| | |
|---|---|
| Tenacity (grams per denier) | 12.8 |
| Tensile modulus (grams per denier) | 309 |
| Elongation (percent) | 3.9 |

The fiber also exhibited a low degree of shrinkage at elevated temperatures and a good retention of tenacity and tensile modulus values at temperatures up to about 150° to 200° C.

EXAMPLE II

Example I was substantially repeated with the exception that the following ingredients were charged to the flask:

(a) 21.6 grams of para-acetoxybenzoic acid (0.12 mole),
(b) 27.2 grams of 1,2-bis(para-carboxyphenoxy)ethane (0.09 mole),
(c) 24.9 grams of terephthalic acid (0.15 mole), and
(d) 50.0 grams of methyl hydroquinone diacetate (0.24 mole).

The resulting aromatic polyester had an inherent viscosity of approximately 1.5, a melting point of 305° C. when subjected to differential scanning calorimetry analysis, and exhibited an anisotropic melt phase.

EXAMPLE III

Example I was substantially repeated with the exception that the following ingredients were charged to the flask:

(a) 43.2 grams of para-acetoxybenzoic acid (0.24 mole),
(b) 18.1 grams of 1,2-bis(para-carboxyphenoxy)ethane (0.06 mole),
(c) 19.9 grams of terephthalic acid (0.12 mole), and
(d) 37.5 grams of methyl hydroquinone diacetate (0.18 mole).

The resulting aromatic polyester had an inherent viscosity of approximately 1.5, a melting point of 311° C. when subjected to differential scanning calorimetry analysis, and exhibited an anisotropic melt phase.

EXAMPLE IV

Example I was substantially repeated with the exception that the following ingredients were charged to the flask:

(a) 37.2 grams of para-acetoxybenzoic acid (0.21 mole),
(b) 9.1 grams of 1,2-bis(para-carboxyphenoxy)ethane (0.03 mole),
(c) 24.9 grams of terephthalic acid (0.15 mole), and
(d) 37.5 grams of methyl hydroquinone diacetate (0.18 mole).

The resulting aromatic polyester had an inherent viscosity of approximately 1.5, a melting point of 320° C. when subjected to differential scanning calorimetry analysis, and exhibited an anisotropic melt phase.

EXAMPLE V

Example I was substantially repeated with the exception that the following ingredients were charged to the flask:

(a) 64.8 grams of para-acetoxybenzoic acid (0.36 mole),
(b) 27.2 grams of 1,2-bis(para-carboxyphenoxy) ethane (0.09 mole),
(c) 5.0 grams of terephthalic acid (0.03 mole), and (d) 25.0 grams of methyl hydroquinone diacetate (0.12 mole).

The resulting aromatic polyester had an inherent viscosity of approximately 1.5, a melting point of 305° C. when subjected to differential scanning calorimetry analysis, and exhibited a anisotropic melt phase.

EXAMPLE VI

Example I was substantially repeated with the exception that the following ingredients were charged to the flask:

(a) 43.2 grams of para-acetoxybenzoic acid (0.24 mole), (b) 21.7 grams of 1,2-bis(para-carboxyphenoxy) ethane (0.07 mole), (c) 17.9 grams of terephthalic acid (0.108 mole), and (d) 37.5 grams of methyl hydroquinone diacetate (0.18 mole).

The resulting aromatic polyester had an inherent viscosity of approximately 1.5, a melting point of 297° C. when subjected to differential scanning calorimetry analysis, and exhibited a anisotropic melt phase.

EXAMPLE VII

A polyester similar to that of Example I was prepared via a direct esterification reaction carried out in the presence of glacial acetic acid. To the flask were added the following:

(a) 33.1 grams of para-hydroxybenzoic acid (0.24 mole), (b) 27.2 grams of 1,2-bis(4-carboxyphenoxy)ethane (0.09 mole), (c) 14.9 grams of terephthalic acid (0.09 mole), (d) 22.3 grams of methyl hydroquinone (0.18 mole), (e) 37 ml. of glacial acetic acid, and (f) 0.4 ml. of acetic anhydride.

The charged flask was vacuum purged with argon and brought to a temperature of 160° C. while placed in a silicone oil bath. The bath temperature next was raised to 280° C. over a five hour period. During this time 48.5 ml. of water and acetic acid were collected. The temperature next was raised to 300° C. and a vacuum was applied to the flask and the pressure was reduced to 1 mm. Hg. over a one hour period. The temperature next was raised to 320° C. and polymerization was continued for 6 hours at a pressure of less than 0.3 mm. Hg.

The resulting aromatic polyester was a tough pearly material exhibiting a fibrous fracture, had an inherent viscosity of 1.3 when tested in accordance with the procedure previously described, a melting point of 242° C. when subjected to differential scanning calorimetry analysis, and exhibited an anisotropic melt phase.

EXAMPLE VIII

Example I was substantially repeated with the exception that the polymerization reaction was catalyzed and carried out in a five gallon stainless steel polymerization vessel with a slight excess (i.e. 2 mole percent) of methyl hydroquinone diacetate in order to compensate for a small amount of this reactant which may be inadvertently volatilized prior to reaction. The following ingredients were charged to the flask:

(a) 4320 grams of para-acetoxybenzoic acid (24 moles), (b) 2718 grams of 1,2-bis(para-carboxyphenoxy) ethane (9 moles), (c) 1494 grams of terephthalic acid (9 moles), (d) 3994 grams of methyl hydroquinone diacetate (19.2 moles), and (e) 3.1 grams of sodium acetate.

The resulting aromatic polyester had an inherent viscosity of 3.04 when tested in accordance with the procedure previously described, and exhibited an anisotropic melt phase.

The polymer was melt extruded into a continuous 20 filament yarn of 240 denier. More specifically, the polymer chip was dried at 130° C. for 18 hours under reduced pressure and transferred to a 1 inch single screw extruder wherein it was melted. This molten polymer was then fed through a metering pump at a rate of 2 pounds per hour to a filter pack containing a 20 hole spinneret, each hole having a diameter of 0.009 inch and a length of 0.012 inch. The spinneret was held at 305° C. and the extruded yarn was quenched in ambient air, and taken up at a rate of 488 meters per minute. The resulting as-spun polyester fibers had the following average single filament properties:

| | |
|---|---|
| Tenacity (grams per denier) | 7.29 |
| Tensile modulus (grams per denier) | 370 |
| Elongation (percent) | 2.4 |

Following thermal treatment in nitrogen for 64 hours at 250° C., in the absence of longitudinal stress the fibers exhibited the following average single filament properties:

| | |
|---|---|
| Tenacity (grams per denier) | 13.3 |
| Tensile modulus (grams per denier) | 339 |
| Elongation (percent) | 3.7 |

Prior to the thermal treatment talc particles were applied to the multifilament yarn to minimize any coalescence of adjoining filaments.

EXAMPLE IX

Example I was substantially repeated with the exception that the following ingredients were charged to the flask:

(a) 43.2 grams of para-acetoxybenzoic acid (0.24 mole), (b) 27.2 grams of 1,2-bis(para-carboxyphenoxy) ethane (0.09 mole), (c) 14.9 grams of terephthalic acid (0.09 mole), and (d) 41.0 grams of chloro hydroquinone diacetate (0.18 mole).

The resulting aromatic polyester had an inherent viscosity of 2.57 when tested in accordance with the procedure previously described, a melting point of 263° C. when subjected to differential scanning calorimetry analysis, and exhibited an anisotroic melt phase.

Following melt extrusion, as described in Example I, the resulting as-spun polyester fiber exhibited the following average single filament properties:

| | |
|---|---|
| Tenacity (grams per denier) | 5.5 |
| Tensile modulus (grams per denier) | 297 |
| Elongation (percent) | 2.3 |

EXAMPLE X

Example I was substantially repeated with the exception that the following ingredients were charged to the flask:

(a) 21.6 grams of para-acetoxybenzoic acid (0.12 mole),
(b) 18.1 grams of 1,2-bis(para-carboxyphenoxy) ethane (0.06 mole),
(c) 29.9 grams of terephthalic acid (0.18 mole), and
(d) 50.0 grams of methyl hydroquinone diacetate (0.24 mole).

The resulting polyester had an inherent viscosity of 3.74, and exhibited an anisotropic melt phase.

Following heat treatment in nitrogen for 66 hours at 250° C. the filaments were plied into a yarn which was then twisted into a two ply cord at a twist level of 8 tpi×8 tpi. This yarn had a denier of 1805 and exhibited a tenacity of 6.5 grams per denier.

EXAMPLE XI

Example I was substantially repeated with the exception that the following ingredients were charged to the flask:

(a) 54.0 grams of para-acetoxybenzoic acid (0.30 mole),
(b) 27.2 grams of 1,2-bis(para-carboxyphenoxy) ethane (0.09 mole),
(c) 10.0 grams of terephthalic acid (0.06 mole), and
(d) 31.2 grams of methyl hydroquinone diacetate (0.15 mole).

The resulting polyester had an inherent viscosity of 2.69, a melting point of 279° C. when subjected to differential scanning calorimetry, and exhibited an anisotropic melt phase.

Following heat treatment in nitrogen for 66 hours at 250° C. the filaments where plied into a yarn which was then twisted into a two ply cord at a twist level of 8 tpi×8 tpi. This yarn had a denier of 1459 and exhibited a tenacity of 6.9 grams per denier.

EXAMPLE XII

Example I was substantially repeated with the exception that the polymerization was carried out in a five gallon stainless steel polymerization vessel and the following ingredients were charged to the vessel:

(a) 4320 grams of para-acetoxybenzoic acid (24 moles),
(b) 2720 grams of 1,2-bis(para-carboxyphenoxy) ethane (9 moles),
(c) 1490 grams of terephthalic acid (9 moles),
(d) 3740 grams of methyl hydroquinone diacetate (18 moles), and
(e) 3.1 grams of sodium acetate (0.038 mole).

The resulting polyester had an inherent viscosity of 2.11, and exhibited an anisotropic melt phase.

Following melt extrusion as described in Example VIII the resulting as-spun fibers exhibited the following average single filament properties:

| Tenacity (grams per denier) | 4.8 |
| Tensile modulus (grams per denier) | 379 |
| Elongation (percent) | 1.5 |

Following thermal treatment in nitrogen for 24 hours at 250° C. in the absence of longitudinal stress the fibers exhibited the following average single filament properties:

| Tenacity (grams per denier) | 13.9 |
| Tensile modulus (grams per denier) | 358 |
| Elongation (percent) | 3.9 |

Prior to the thermal treatment talc particles were applied to the multifilament yarn to minimize any coalescence of adjoining filaments.

EXAMPLE XIII

Example I was substantially repeated with the exception that the polymerization was carried out in a forty gallon polymerization vessel and the following ingredients were charged to the vessel:

(a) 66.6 pounds of para-acetoxybenzoic acid (168 moles),
(b) 41.9 pounds of 1,2-bis(para-carboxyphenoxy) ethane (63 moles),
(c) 23.0 pounds of terephthalic acid (63 moles),
(d) 59.7 pounds of methyl hydroquinone diacetate (130.2 moles),
(e) 17.5 grams of zinc acetate (0.095 mole), and
(f) 70.0 grams of antimony oxide (0.24 mole).

The resulting polyester had an inherent viscosity of 2.38, a melting point of 278° C. when subjected to differential scanning calorimetry, and exhibited an anisotropic melt phase.

The polymer was melt extruded into a continuous 100 filament yarn of 1200 denier. More specifically, the polymer was dried at 140° C. for 6 hours under reduced pressure and transferred to a 2 inch single screw extruder fitted with a metering pump and filter pack. The molten polymer was extruded at a rate of 11 pounds per hour through a 100 hole spinneret with each hole having a diameter of 0.005 inch and a length of 0.008 inch. The spinneret was held at 300° C., the extruded yarn was quenched in ambient air, and was taken up at a rate of 670 meters per minute. The resulting as-spun polyester filaments exhibited the following average single filament properties:

| Tenacity (grams per denier) | 7.8 |
| Tensile modulus (grams per denier) | 365 |
| Elongation (percent) | 2.5 |

Following thermal treatment in nitrogen for 18 hours at 250° C. the fibers exhibited the following average single filament properties:

| Tenacity (grams per denier) | 15.1 |
| Tensile modulus (grams per denier) | 389 |
| Elongation (percent) | 3.9 |

Prior to the thermal treatment talc particles were applied to the multifilament yarn to minimize any coalescence of adjoining fibers.

EXAMPLE XIV

Example IX was substantially repeated with the exception that the following ingredients were charged to the flask:

(a) 43.24 grams of para-acetoxybenzoic acid (0.24 mole), (b) 27.18 grams of 1,2-bis(para-carboxyphenoxy) ethane (0.09 mole),
(c) 14.94 grams of terephthalic acid (0.09 mole), and
(d) 42.00 grams of chloro hydroquinone diacetate (0.18 mole).

The resulting polyester had an inherent viscosity of 2.85, a flow point of 278° C. when viewed under a microscope with a heated stage, and exhibited an anisotropic melt phase.

Following melt extrusion as described in Example I, the resulting as-spun polyester fiber exhibited the following average single filament properties:

| | |
|---|---|
| Tenacity (grams per denier) | 6.0 |
| Tensile modulus (grams per denier) | 339 |
| Elongation (percent) | 2.0 |

Following thermal treatment in nitrogen for 17 hours at 250° C. the fiber exhibited the following average single filament properties:

| | |
|---|---|
| Tenacity (grams per denier) | 13.6 |
| Tensile modulus (grams per denier) | 371 |
| Elongation (percent) | 3.5 |

Although the invention has been described with preferred embodiments it is to be understood that variations and modifications may be employed without departing from the concept of the invention as defined in the following claims.

We claim:

1. A melt processable polyester capable of forming an anisotropic melt phase at a temperature no higher than approximately 320° C. consisting essentially of the recurring moieties I, II, III, and IV wherein:

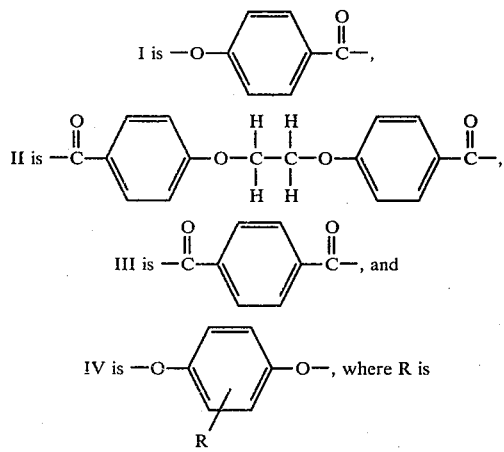

methyl, chloro, bromo, or mixtures thereof, and is substituted for a hydrogen atom present upon the aromatic ring, and wherein said polyester comprises approximately 20 to 60 mole percent of moiety I, approximately 5 to 18 mole percent of moiety II, approximately 5 to 35 mole percent of moiety III, and approximately 20 to 40 mole percent of moiety IV.

2. A melt processable polyester in accordance with claim 1 which exhibits an anisotropic melt phase at a temperature below 300° C.

3. A melt processable polyester in accordance with claim 1 which exhibits an anisotropic melt phase at a temperature below 290° C.

4. A melt processable polyester in accordance with claim 1 wherein said polyester comprises approximately 30 to 50 mole percent of moiety I.

5. A melt processable polyester in accordance with claim 1 wherein said polyester comprises approximately 10 to 15 percent of moiety II.

6. A melt processable polyester in accordance with claim 1 wherein moiety IV is:

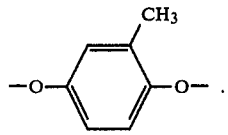

7. A melt processable polyester in accordance with claim 1 wherein moiety IV is:

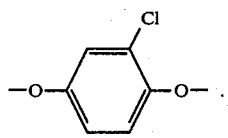

8. A melt processable polyester in accordance with claim 1 wherein moiety IV is:

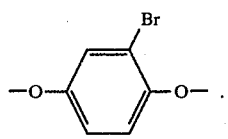

9. A fiber which has been melt spun from the polyester of claim 1.

10. A fiber which has been melt spun from the polyester of claim 1 and subsequently thermally processed.

11. A melt processable polyester capable of forming an anisotropic melt phase at a temperature below 300° C. consisting essentially of the recurring moieties I, II, III, and IV wherein:

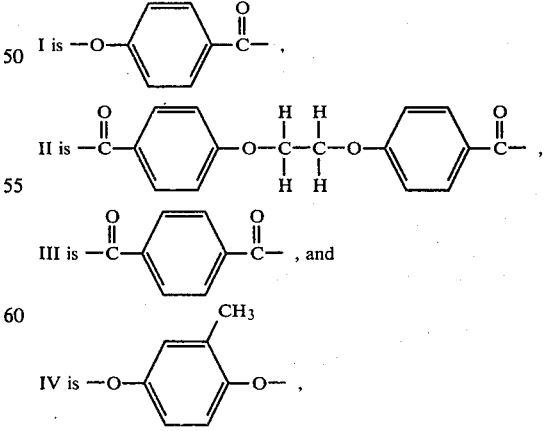

and wherein said polyester comprises approximately 35 to 45 mole percent of moiety I, approximately 10 to 15 mole percent of moiety II, approximately 15 to 25 mole percent of moiety III, and approximately 25 to 35 mole percent of moiety IV, with the proviso that the total molar concentration of moieties II and III is substantially identical to that of moiety IV.

12. A melt processable polyester in accordance with claim 11 which exhibits an anisotropic melt phase at a temperature below 290° C.

13. A fiber which has been melt spun from the polyester of claim 11.

14. A fiber which has been melt spun from the polyester of claim 11 and subsequently thermally processed.

15. A melt processable polyester capable of forming an anisotropic melt phase at a temperature below 300° C. consisting essentially of the recurring moieties I, II, III, and IV wherein:

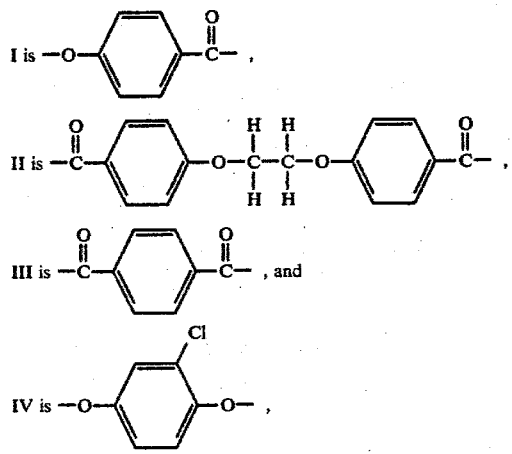

and wherein said polyester comprises approximately 35 to 45 mole percent of moiety I, approximately 10 to 15 mole percent of moiety II, approximately 15 to 25 mole percent of moiety III, and approximately 25 to 35 mole percent of moiety IV, with the proviso that the total molar concentration of moieties II and III is substantially identical to that of moiety IV.

16. A melt processable polyester in accordance with claim 15 which exhibits an anisotropic melt phase at a temperature below 290° C.

17. A fiber which has been melt spun from the polyester of claim 15.

18. A fiber which has been melt spun from the polyester of claim 15 and subsequently thermally processed.

19. A melt processable polyester capable of forming an anisotropic melt phase at a temperature below 300° C. consisting essentially of the recurring moieties I, II, III, and IV wherein:

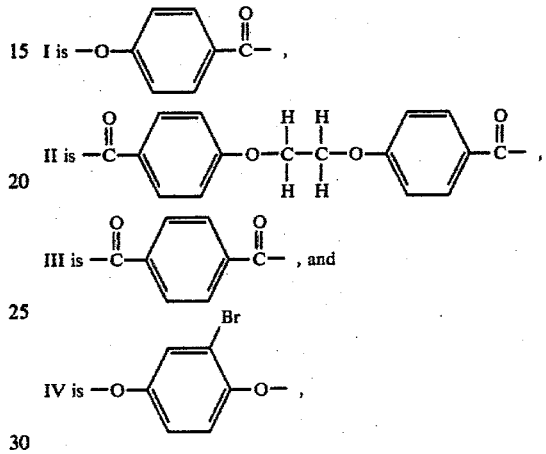

wherein said polyester comprises approximately 35 to 45 mole percent of moiety I, approximately 10 to 15 mole percent of moiety II, approximately 15 to 25 mole percent of moiety III, and approximately 25 to 35 mole percent of moiety IV, with the proviso that the total molar concentration of moieties II and III is substantially identical to that of moiety IV.

20. A melt processable polyester in accordance with claim 19 which exhibits an anisotropic melt phase at a temperature below 290° C.

21. A fiber which has been melt spun from the polyester of claim 19.

22. A fiber which has been melt spun from the polyester of claim 19 and subsequently thermally processed.

* * * * *